(No Model.)

F. STEFFEN.
CORN HARVESTER.

No. 473,095. Patented Apr. 19, 1892.

Witnesses
C. J. Williamson,
A. L. Hough

Inventor
Fred Steffen
by Franklin H. Hough
his atty.

THE NORRIS PETERS CO., PHOTO-LITHO., WASHINGTON, D. C.

UNITED STATES PATENT OFFICE.

FRED STEFFEN, OF BURLINGTON, WISCONSIN.

CORN-HARVESTER.

SPECIFICATION forming part of Letters Patent No. 473,095, dated April 19, 1892.

Application filed January 2, 1892. Serial No. 416,841. (No model.)

*To all whom it may concern:*

Be it known that I, FRED STEFFEN, a citizen of the United States, residing at Burlington, in the county of Racine and State of Wisconsin, have invented certain new and useful Improvements in Corn-Harvesters; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in machines for harvesting corn; and it has for its object to provide a simple and inexpensive machine of the character referred to by the use of which two rows of corn may be cut at the same time, the stalks being delivered upon platform in such position as to permit of their being readily shocked or bound into bundles, which will be deposited in regular rows at the rear of the machine.

A further object of the invention is to provide for the ready adjustment of the cutting-blades, so as to permit the stalks being cut at any desired height from the ground.

To these ends and to such others as the invention may pertain the same consists in the peculiar construction and in the novel combination, arrangement, and adaptation of parts, all as more fully hereinafter described, shown in the accompanying drawings, and then specifically defined in the appended claims.

The invention is clearly illustrated in the accompanying drawings, which, with the letters of reference marked thereon, form a part of this specification, and in which—

Figure 1:
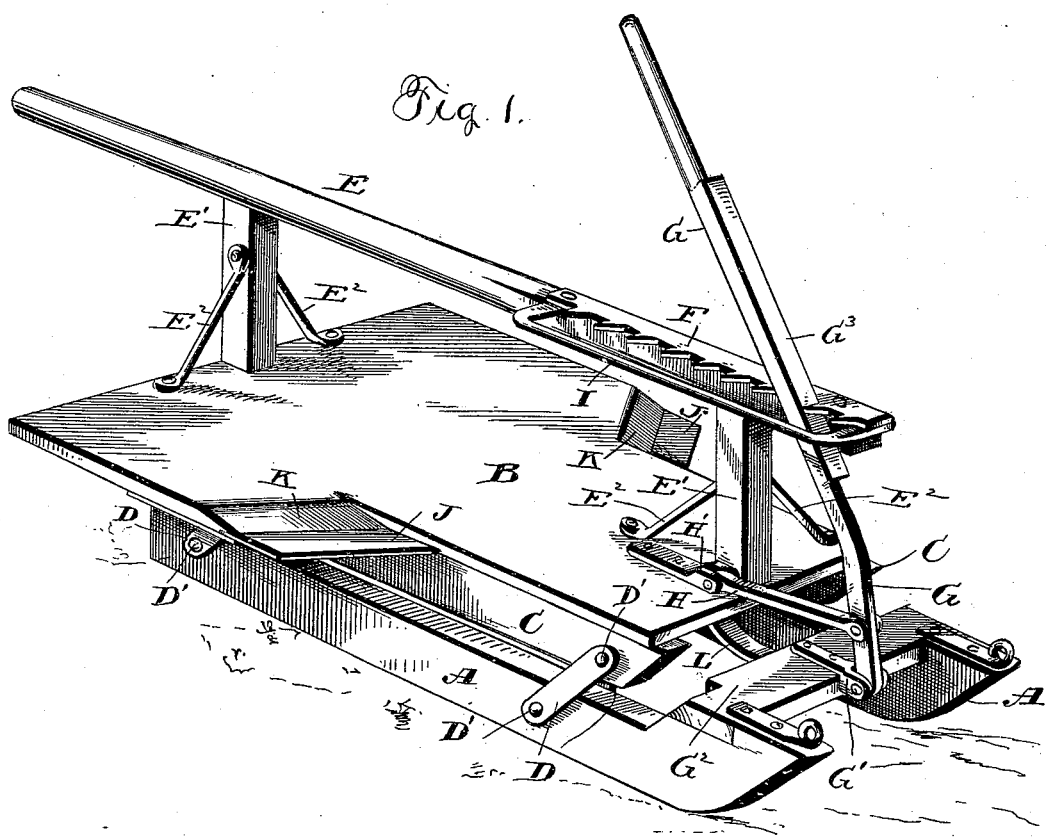
Figure 2:
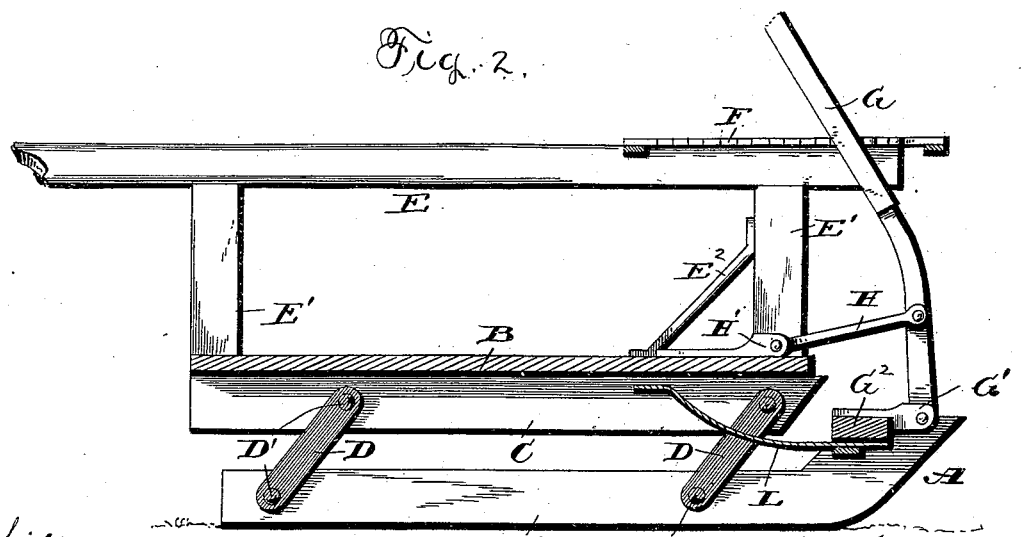

Figure 1 is a perspective view of a corn-harvesting machine embodying my improvements. Fig. 2 is a central longitudinal vertical section of the same.

Reference now being had to the details of the drawings by letter, A A represent the runners of the machine, which are in all respects similar in form to the runners of an ordinary sled.

B is a platform or floor, the sills C C of which are connected with the runners A by means of arms D, which are arranged in pairs, as shown, upon the inner and outer faces of the sills and runners and pivotally attached thereto by means of suitable bolts or pivots D' D'. The forward portion of the platform B for substantially one half of the length of the entire platform is of a width corresponding with the width of the runners or of the running portion of the machine, while the rear half of the platform extends for a considerable distance beyond the runners upon either side.

E is a timber, which is secured to the upper ends of the posts or uprights E' E', which rise from the longitudinal center of the platform, at the front and rear ends of the same, as shown, suitable braces $E^2$ being employed to secure the posts firmly in position. This timber E extends from the front end of the machine to a point some distance to the rear end thereof. A rack-bar F is provided upon the timber E at its forward end.

G is a lever, which at its lower end is pivoted between the ears of the casting G', attached to the timber $G^2$, which connects the forward ends of the runners.

H is a link or bar, which at one of its ends is pivotally attached to the lever G at a point near the lower end of the lever, and at its rear end the said bar is pivotally attached to the casting H', secured to the forward end of the platform B. The lever G is provided upon one of its edges with a flange-plate or extension $G^3$, which is adapted to engage the notches of the rack-bar F. A guard-rail I serves to guide the lever in its movements.

Upon each side of the machine and attached to the platform B are the cutting-blades J J, which consist of plates of steel, the inner ends of which are secured to the sills C, the said blades extending outwardly and inclined at an angle toward the rear end of the machine, the rear edges of the blades being attached to the under face of the widened rear half of the platform, as shown. The upper face of the widened portion of the platform at the points at which the blades J are attached is beveled, as indicated at K, to permit the stalks after cutting to pass readily to the platform.

The operation of the machine is simple and readily understood. The platform B having been adjusted so as to raise the cutting-blades to the height at which it is desired to cut the stalks, the lever is set by the engagement of the flange-plate G³ thereon with the notches of the rack-bar F. The machine is moved between two rows of corn, thus bringing the cutting-blades J into operative position upon either side of the machine. The corn as cut will by the forward movement of the machine be carried upon the rear portion of the platform, the stalks still retaining their upright position. As the stalks thus move inward the attendants upon the platform guide the same against the sides of the timber E, where they are bound and pushed off at the rear end of the platform. The rear end of the timber E, extending as it does for a considerable distance beyond the rear end of the machine, serves to retain the shock in an upright position as it leaves the machine. A spring L, having one of its ends attached to the cross-timber G² and its free end bearing against the lower face of the platform B when the same is lowered, serves to prevent sudden jar to the platform when the same is lowered.

Having thus described my invention, what I claim to be new, and desire to secure by Letters Patent, is—

1. In a corn-harvesting machine, the combination, with the runners, the platform, the beveled cutting-blades attached to the sides of the platform, the arms pivotally attached at their ends to the runners and to the platform, respectively, lever mechanism for raising and lowering the platform, the rack-bar and flange-plate upon the operating-lever for locking the platform in its adjusted position, and a spring on the runners, with its rear end free and ex-extended beneath the platform, substantially as and for the purpose described.

2. The runners, the platform connected therewith by means of bars pivoted to the runners and platform, respectively, the cutting-blades at the sides of the platform, the lever mechanism for raising and lowering the platform, the rack-bar and flange-plate for locking the parts in their adjusted position, and the timber E, supported upon posts rising from the platform and extending over the longitudinal center of the platform, terminating at its rear end at a point some distance to the rear of the platform, and a spring on the runners with its rear end free and extended beneath the platform, substantially as described, and for the purpose specified.

In testimony whereof I affix my signature in presence of two witnesses.

FRED STEFFEN.

Witnesses:
CHARLES B. WAGNER,
ALBERT F. KARCHER.